United States Patent
Roh

(10) Patent No.: US 9,298,347 B2
(45) Date of Patent: Mar. 29, 2016

(54) MOBILE TERMINAL AND APPLICATION ICON MOVING METHOD THEREOF

(71) Applicant: LG ELECTRONICS INC., Seoul (KR)

(72) Inventor: Hyeongseok Roh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 192 days.

(21) Appl. No.: 14/012,803

(22) Filed: Aug. 28, 2013

(65) Prior Publication Data

US 2014/0068477 A1 Mar. 6, 2014

(30) Foreign Application Priority Data

Sep. 4, 2012 (KR) .................. 10-2012-0097911

(51) Int. Cl.
| | |
|---|---|
| *G06F 17/00* | (2006.01) |
| *G06F 3/0481* | (2013.01) |
| *G06F 3/0482* | (2013.01) |
| *G06F 3/0486* | (2013.01) |
| *G06F 3/0488* | (2013.01) |
| *H04M 1/725* | (2006.01) |

(52) U.S. Cl.
CPC .......... *G06F 3/04817* (2013.01); *G06F 3/0482* (2013.01); *G06F 3/0486* (2013.01); *G06F 3/04883* (2013.01); *G06F 3/04886* (2013.01); *G06F 2203/04803* (2013.01); *H04M 1/72583* (2013.01); *H04M 2250/22* (2013.01)

(58) Field of Classification Search
CPC ............................. G06F 3/0486; G06F 3/04883
USPC ........................... 715/250, 763, 765, 204, 243
See application file for complete search history.

(56) References Cited

U.S. PATENT DOCUMENTS

| | | | | |
|---|---|---|---|---|
| 8,984,388 | B2 * | 3/2015 | Seo | H04N 5/445 715/204 |
| 2004/0192440 | A1 * | 9/2004 | Evans et al. | 463/30 |
| 2008/0184112 | A1 * | 7/2008 | Chiang et al. | 715/700 |
| 2010/0162160 | A1 * | 6/2010 | Stallings et al. | 715/784 |
| 2011/0061010 | A1 | 3/2011 | Wasko | |

FOREIGN PATENT DOCUMENTS

DE 102009043719 A1 4/2011

OTHER PUBLICATIONS

European Patent Office Application Serial No. 13181408.9, Search Report dated Feb. 3, 2014, 9 pages.
Apple, "iPhone User Guide for iPhone and iPhone 3G", XP-007907619, 2008, 154 Pages.

* cited by examiner

*Primary Examiner* — Stephen Hong
*Assistant Examiner* — Matthew Ludwig
(74) *Attorney, Agent, or Firm* — Lee, Hong, Degerman, Kang & Waimey

(57) ABSTRACT

A mobile terminal and an application icon moving method thereof are provided. When a predetermined application icon is selected from a menu screen including a plurality of application icons and moved to a control region, a default home screen or the whole home screen stored in a memory may be selectively displayed according to a moved position of the corresponding icon, and also an icon-insertable position may be visually guided on the displayed home screen. This may allow a user to execute the movement of the application icon in an easy, convenient manner.

20 Claims, 14 Drawing Sheets

DISPLAYING CANDIDATE POSITION OF EACH HOME
SCREEN RESPONSIVE TO ICON MOVEMENT

DISPLAYING CANDIDATE POSITION OF EACH HOME
SCREEN RESPONSIVE TO ICON MOVEMENT

DISPLAYING CANDIDATE POSITION ON
MAGNIFICATION WINDOW

FIG. 9
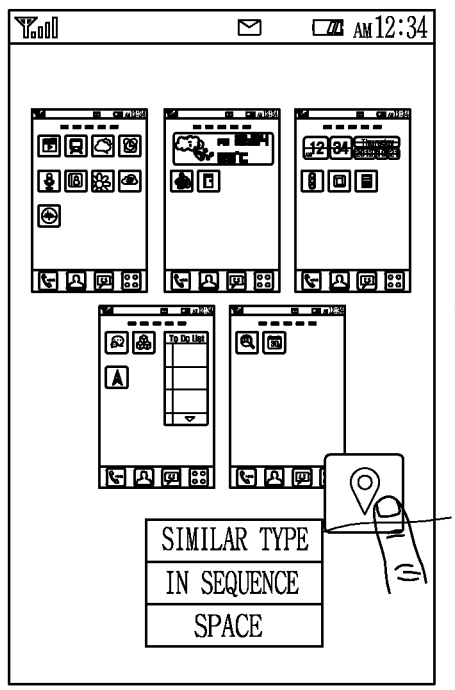
DISPLAYING ICON ARRANGEMENT MENU
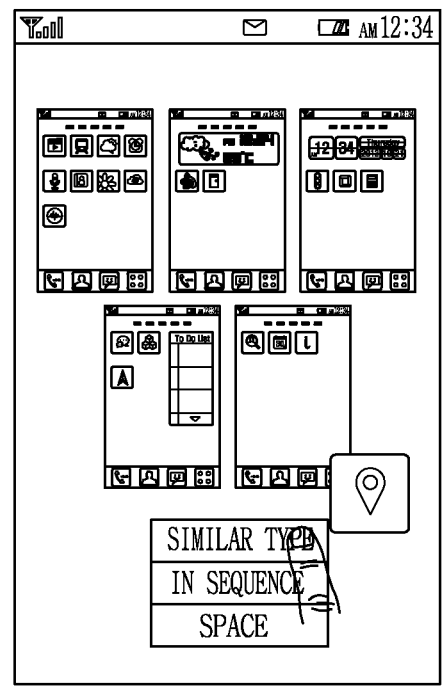
SELECTING SPECIFIC ITEM
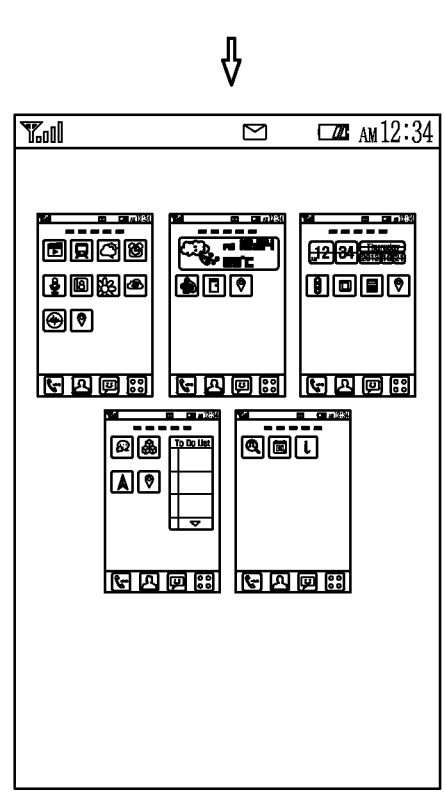
MOVING AND ARRANGING ICON
ACCORDING TO SELECTED ITEM

DRAG & DROP OF ICON ONTO EMPTY AREA    GENERATING NEW HOME SCREEN

MOBILE TERMINAL AND APPLICATION ICON MOVING METHOD THEREOF

CROSS-REFERENCE TO RELATED APPLICATION

Pursuant to 35 U.S.C. §119(a), this application claims the benefit of earlier filing date and right of priority to Korean Application No. 10-2012-0097911, filed on Sep. 4, 2012, the contents of which is incorporated by reference herein in its entirety.

BACKGROUND OF THE DISCLOSURE

1. Field of the Disclosure

This specification relates to a mobile terminal capable of facilitating execution an icon movement through an intuitive UI, and an application icon moving method thereof.

2. Background of the Disclosure

Mobile terminals (or electronic devices) may be configured to perform various functions, for example, data and voice communication, capturing images or video, storing voice, reproducing music files via a speaker system, displaying images or video and the like. Some of mobile terminals may include an additional function of playing games, and other mobile terminals may be implemented as multimedia players. In addition, in recent time, mobile terminals can receive broadcast or multicast signals to allow viewing of video or television programs.

Furthermore, many efforts are undergoing to support or enhance various functions of such mobile terminals. Such many efforts include not only changes and improvement of structural components implementing a mobile terminal but also software or hardware improvement. Among others, a touch function of the mobile terminal may allow users, who are unfamiliar to a button/key input, to conveniently execute operations of the terminal using a touch screen. In recent time, the touch function is simply used as an input function, and has also become an important function of the terminal together with a user interface UI.

In general, when a mobile terminal is powered on, a preset home screen may be displayed on a screen. At least one home screen may be generated according to users' needs. One home screen selected by a user is generally displayed as wallpaper. The at least one home screen may be changed according to a home screen profile defined by the user (for example, task, financial, etc.) or according to a user's page turn input (for example, a navigation key or a touch input) when the home screen is arranged in a page form.

At least one widget may be displayed (registered) in form of an icon on the at least one home screen. This may allow a user to conveniently execute a desirable application by selecting a specific icon. The widget icon (hereinafter, referred to an 'icon') displayed on the home screen may be generated according to attributes (position, transparency, size, shape, etc.) of a display through menus, or automatically generated based on preset attributes when a predetermined application is installed by a user.

The icon displayed on the home screen may be changeable, namely, moving, adding, deleting, combining and the like. Among others, the icon movement may include a position movement within the home screen, and movement from a full application screen (menu screen) into the home screen.

The user may apply a long touch onto an icon to be moved first, in order to move the icon from the full application screen (menu screen) to the home screen. In response to the long touch to the icon, the full application screen (menu screen) may disappear and a user-preset home screen may be displayed. The user may check an empty space of the home screen, directly move an icon, which the user desires to move) to a desired position to be arranged (inserted) thereon, and complete the icon movement.

However, when the long touch is applied to a predetermined icon desired to move, one home screen selected by the user among a plurality of home screens generated by the user, namely, a default home screen may be displayed. Therefore, when a specific icon is desired to be moved to another home screen as well as a user-selected home screen so as to be aligned (arranged, inserted) thereon, each home screen has to be selected one by one and thereafter the movement and alignment has to be executed individually for each home screen, which causes the user's inconvenience.

SUMMARY OF THE DISCLOSURE

Therefore, an aspect of the detailed description is to provide a mobile terminal, capable of easily executing an icon movement from a full application screen (menu) to a home screen and an icon edition on the home screen, and an application icon moving method thereof.

Another aspect of the detailed description is to provide a mobile terminal, capable of providing a user interface (UI) for easily executing an icon movement from a full application screen (menu) to a home screen and an icon edition on the home screen, and an application icon moving method thereof.

To achieve these and other advantages and in accordance with the purpose of this specification, as embodied and broadly described herein, there is provided an application icon moving method for a mobile terminal including displaying a menu screen including a plurality of application icons, moving a predetermined application icon to a control region, the predetermined application icon selected from the menu screen according to a user's touch input, selectively displaying a default home screen or the whole home screen on a home screen edition screen according to a moved position of the application icon within the control region, and arranging the application icon moved into the control region on the default home screen or the whole home screen.

The specific icon selected may be at least one icon, and the selected at least one icon may be connected in a form of chain so as to be moved simultaneously.

The home screen edition screen may be displayed when the predetermined application icon is long touched and then dragged to the control region located on a lower portion of the menu screen.

The selectively displaying of the default home screen or the whole home screen may include displaying the whole home screen when the predetermined application icon is moved to a first area within the control region, the first area displaying a home button, and displaying the default home screen when the predetermined application icon is moved to a second area within the control region, the second area displaying other buttons except for the home button.

The method may further include displaying a candidate position, in which the predetermined application icon is to be inserted, within each home screen.

The candidate position may have predetermined shape and size and be displayed with being highlighted.

The candidate position may be displayed on one home screen or the whole home screen according to user setting or displayed when a partial area of a home screen is magnified.

The candidate position displayed on the one home screen may be displayed on a home screen selected by the user, and the candidate position displayed on the whole home screen may be displayed in an activated or deactivated state so as to be state-changed according to a user input.

The application icon may be arranged within a home screen in a dragging or flicking manner, or automatically arranged by being rolled into a home screen according to an inclination of the mobile terminal.

To achieve these and other advantages and in accordance with the purpose of this specification, as embodied and broadly described herein, there is provided a mobile terminal including a display configured to display a menu screen, a memory configured to store at least one home screen, and a controller configured to automatically display a default home screen or the whole home screen on a home screen edition screen according to a moved position of a predetermined application icon when the application icon is selected from the menu screen and moved into a control region.

The specific icon selected may be at least one icon, and the selected at least one icon may be connected in a form of chain so as to be moved simultaneously.

The controller may convert the menu screen into the home screen edition screen when the predetermined application icon is long touched and then dragged to the control region located on a lower portion of the menu screen.

The controller may display the whole home screen when the predetermined application icon is moved to a first area for displaying a home button within the control region, and display the default home screen when the predetermined application icon is moved to a second area for displaying other buttons except for the home button within the control region.

The controller may display a candidate position, in which the predetermined application icon is to be inserted, within at least one home screen when home screens are displayed on the home screen edition screen. The candidate position may have predetermined shape and size and be displayed with being highlighted.

The controller may display the candidate position within one home screen or the whole home screen according to a user-selected displaying method or display the candidate position when a partial area of a home screen is magnified.

The controller may display the candidate position on a home screen every time the home screen is selected by the user.

The controller may display the candidate position in an activated or deactivated state within the whole home screen, and automatically remove the other candidate positions when the icon movement to a predetermined candidate position is decided.

The icon moved to the control region may be arranged within a home screen in a dragging or flicking manner, or automatically arranged by being rolled into the home screen according to an inclination of the mobile terminal.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 9 is a view illustrating a fifth exemplary embodiment of an application icon moving method in accordance with the present disclosure;

DETAILED DESCRIPTION OF THE DISCLOSURE

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it can be easily understood by those skilled in the art that the configuration according to the following description can be applied to the stationary terminals except for components particularly provided for mobility.

Figure 1:
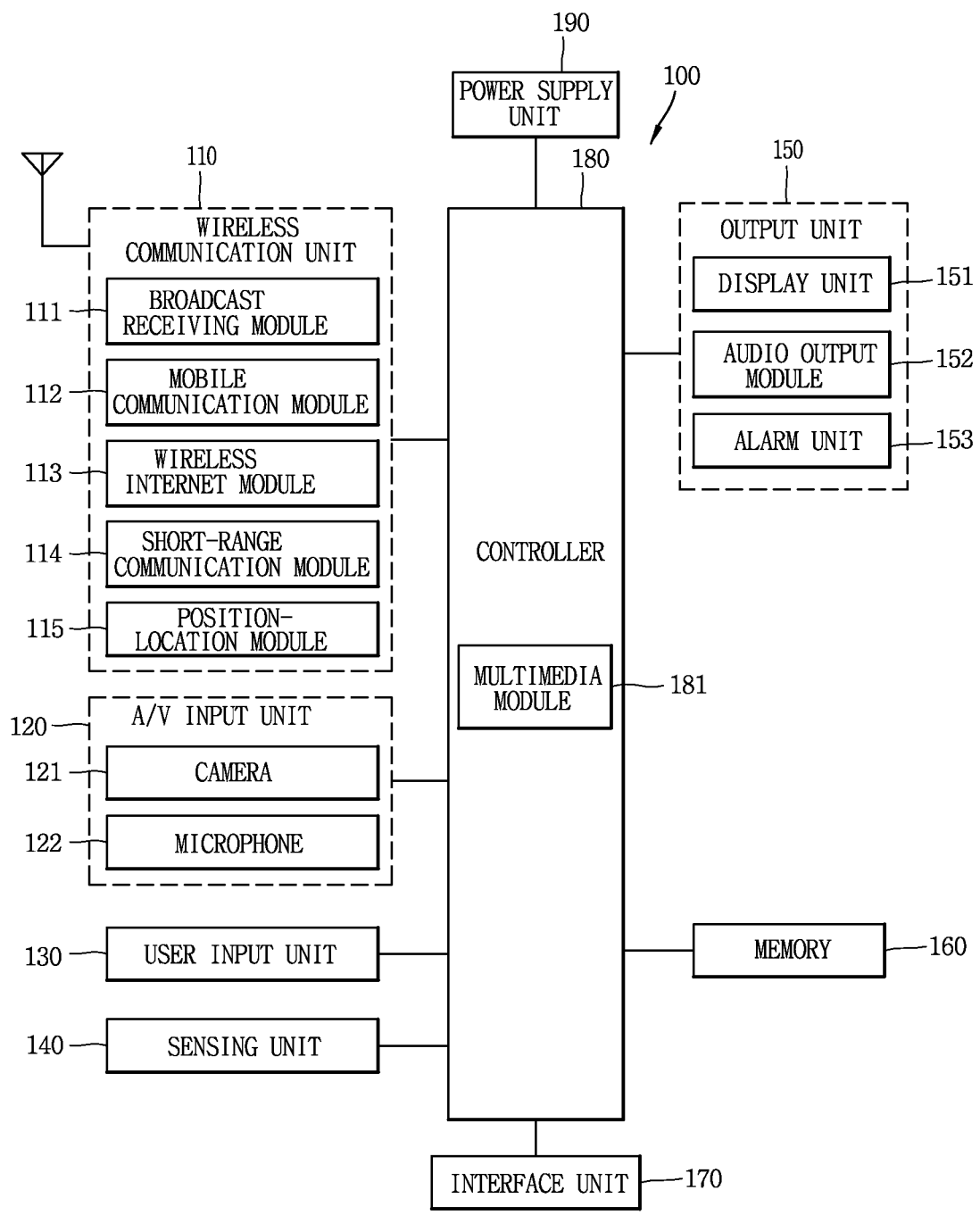
FIG. 1 is a block diagram of a mobile terminal in accordance with one exemplary embodiment of the present disclosure.

FIG. 1 is a block diagram of a mobile terminal in accordance with one embodiment of the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal. Examples of such wireless Internet access may include Wireless LAN (WLAN), Wi-Fi, Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUE-TOOTH, Radio Frequency IDentification (RFID), Infrared Data Association (IrDA), Ultra-WideBand (UWB), ZigBee, Near Field Communication (NFC) and the like. Short-range communication related modules for user account, in addition to those short-range communication modules, may employ a method proposed in the present disclosure.

The position location module 115 denotes a module for detecting or calculating a position of a mobile terminal. An example of the position location module 115 may include a Global Position System (GPS) module. Under the current technique, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Also, the GPS module may continuously calculate a current position in real time so as to obtain speed information.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, and the like. Here, the sensing unit 140 may include a proximity sensor 141, which will be described later in relation to a touch screen.

The sensing unit 140 includes a geomagnetic sensor to calculate a moving direction when a user moves, a gyro sensor to calculate a rotating direction, and an acceleration sensor.

The interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The output unit 150 is configured to output an audio signal, a video signal or an alarm signal. The output unit 150 may include a display 151, an audio output module 152, an alarm 153, and the like.

The display 151 may output information processed in the mobile terminal 100. For example, when the mobile terminal is operating in a phone call mode, the display 151 will provide a User Interface (UI) or a Graphic User Interface (GUI) which includes information associated with the call.

Meanwhile, as mentioned above, a touch screen can be configured as the display 151 and the touchpad are layered with each other to work in cooperation with each other. This configuration permits the display 151 to function both as an input device and as an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. Some of the displays can be configured to be transparent such that it is possible to see the exterior therethrough. These displays may be called transparent displays. A representative example of the transparent display may include a Transparent Organic Light Emitting Diode (TOLED), and the like. The mobile terminal 100 may include two or more of such displays 151 according to its embodiment. For example, the mobile terminal 100 may simultaneously include an external display (not shown) and an internal display (not shown). The touch screen may be configured so as to detect a touch input pressure as well as touch input position and touch input area.

The audio output module 152 may output audio data which is received from the wireless communication unit 110 in various modes including call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. When a call signal or a message is received, the alarm unit 153 may output vibration to make a user recognize the event occurrence. Of course, the signal for notifying the event occurrence may be output through the display unit 151 or the audio output module 152.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The mobile terminal 100 shown in FIG. 1 may be configured to operate within a communication system which transmits data via frames or packets, including both wireless and wireline communication systems, and satellite-based communication systems.

Figure 2:
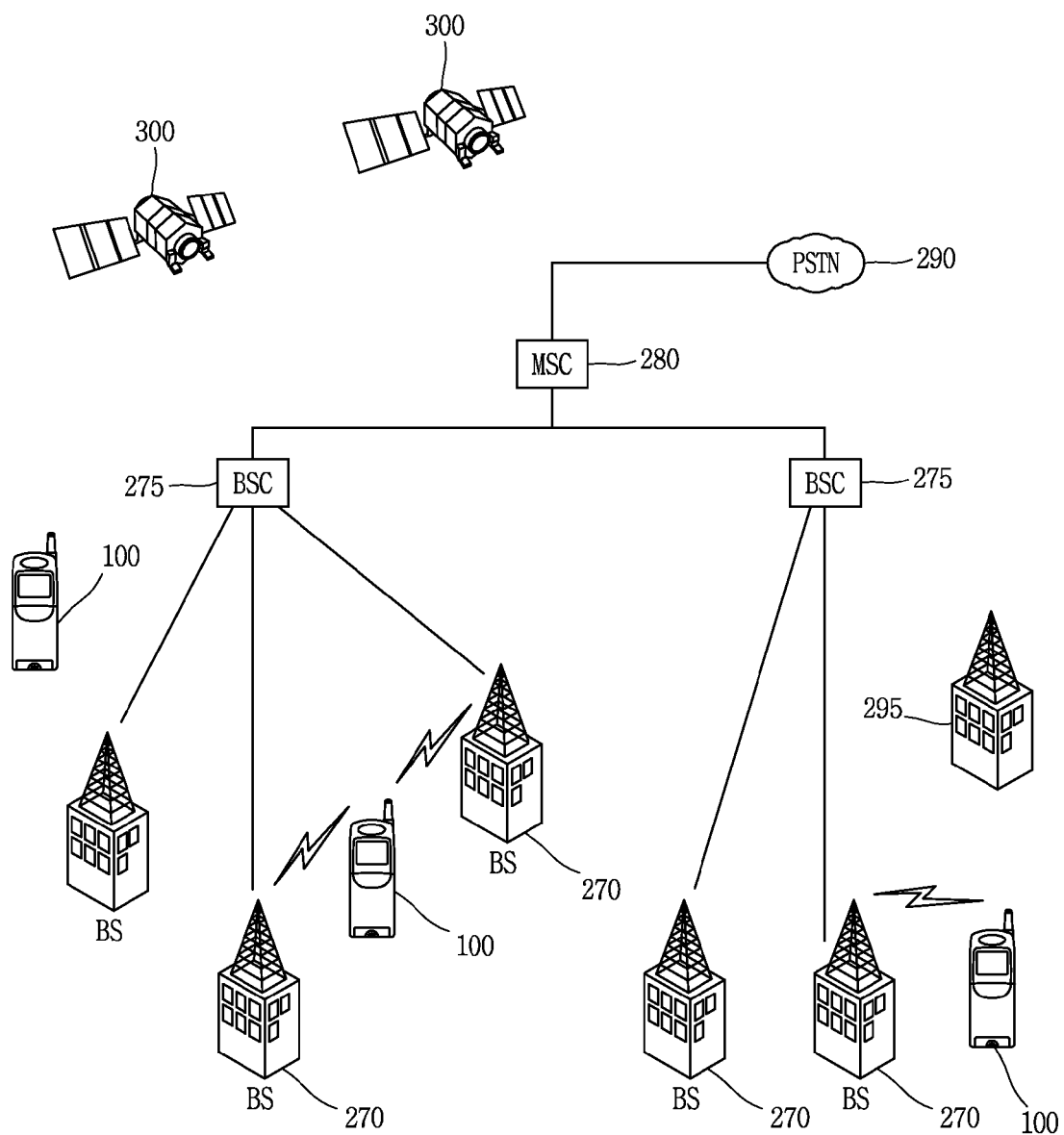
FIG. 2 is a block diagram of a communication system operable with a mobile terminal in accordance with one exemplary embodiment.

FIG. 2 shows a wireless communication system which is operable with the mobile terminal in accordance with the one embodiment.

As shown in FIG. 2, a wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2 further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

In general, a home screen is a screen which enhances user convenience and expresses user's personality using wallpaper which is displayed when a mobile terminal is powered on. At least one application icon (widget icon) may be registered on each home screen.

The user may generate and store at least one home screen, and thereafter directly select and display a particular home screen according to needs, or automatically change the home screen by setting predetermined display attributes.

However, although the user selects or automatically changes the home screen in the related art, the user is able to view only one home screen. Consequently, when the user moves a predetermined application icon to a plurality of home screens, the user has to disadvantageously select each home screen one by one and move the corresponding icon.

The present disclosure provides an application icon moving method, capable of moving an application icon (widget icon) located on a full application screen (menu screen) to at least one home screen so as to easily arrange (insert) the corresponding icon onto the at least one home screen individually or simultaneously, and a user interface (UI) therefor.

To this end, the present disclosure may selectively provide two types of home screen display forms according to a type of input when the input for moving an icon has been sensed. The input for moving the icon refers to an operation that a specific icon is long touched and dragged to a predetermined control region (i.e., long touch & drag), and the input type refers to a dragged position within the control region.

Also, the two types of home screen display forms may include a default home screen and the whole home screen. The default home screen is one home screen, which has been selected by a user as wallpaper among all the home screens generated by the user. The default home screen is always displayed when the mobile terminal is powered on. The whole home screen refers to all the number of home screens generated by the user.

According to the two types of home screen display forms, the present disclosure may display the whole home screen when a specific icon selected on the full application screen (menu screen) is moved to a first area of the control region, and display the default home screen when the icon is moved to a second area of the control region. This may allow the user to conveniently execute a home screen edition and an icon edition (for example, moving, deleting, combining, etc.) with respect to one or a plurality of home screens according to needs.

Selective Displaying of Default Home Screen And the Whole Home Screen

Figure 3A:
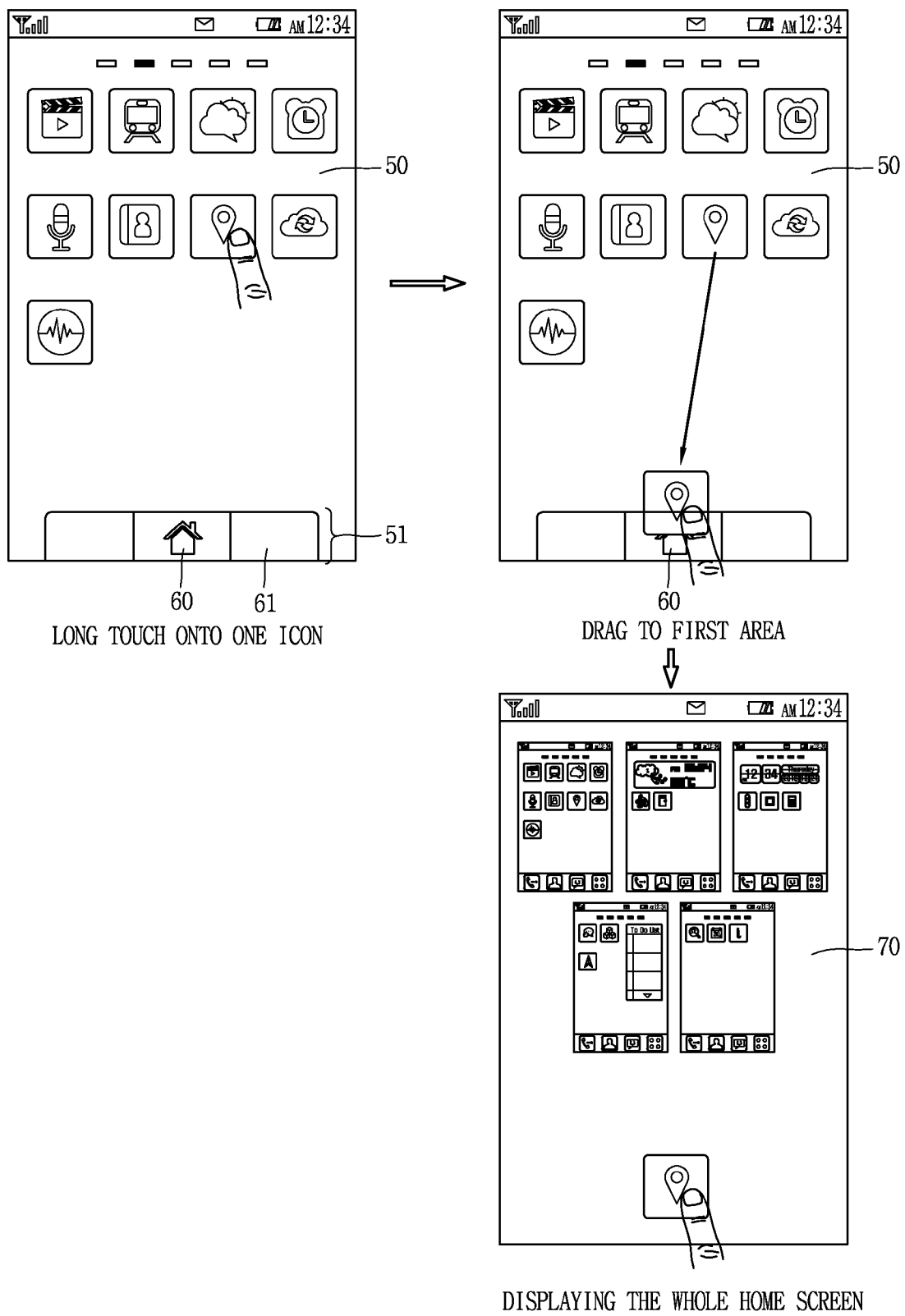
FIGS. 3A and 3B are views illustrating a conception of moving an icon from a full application screen (menu screen) to a home screen according to the present disclosure.
Figure 3B:
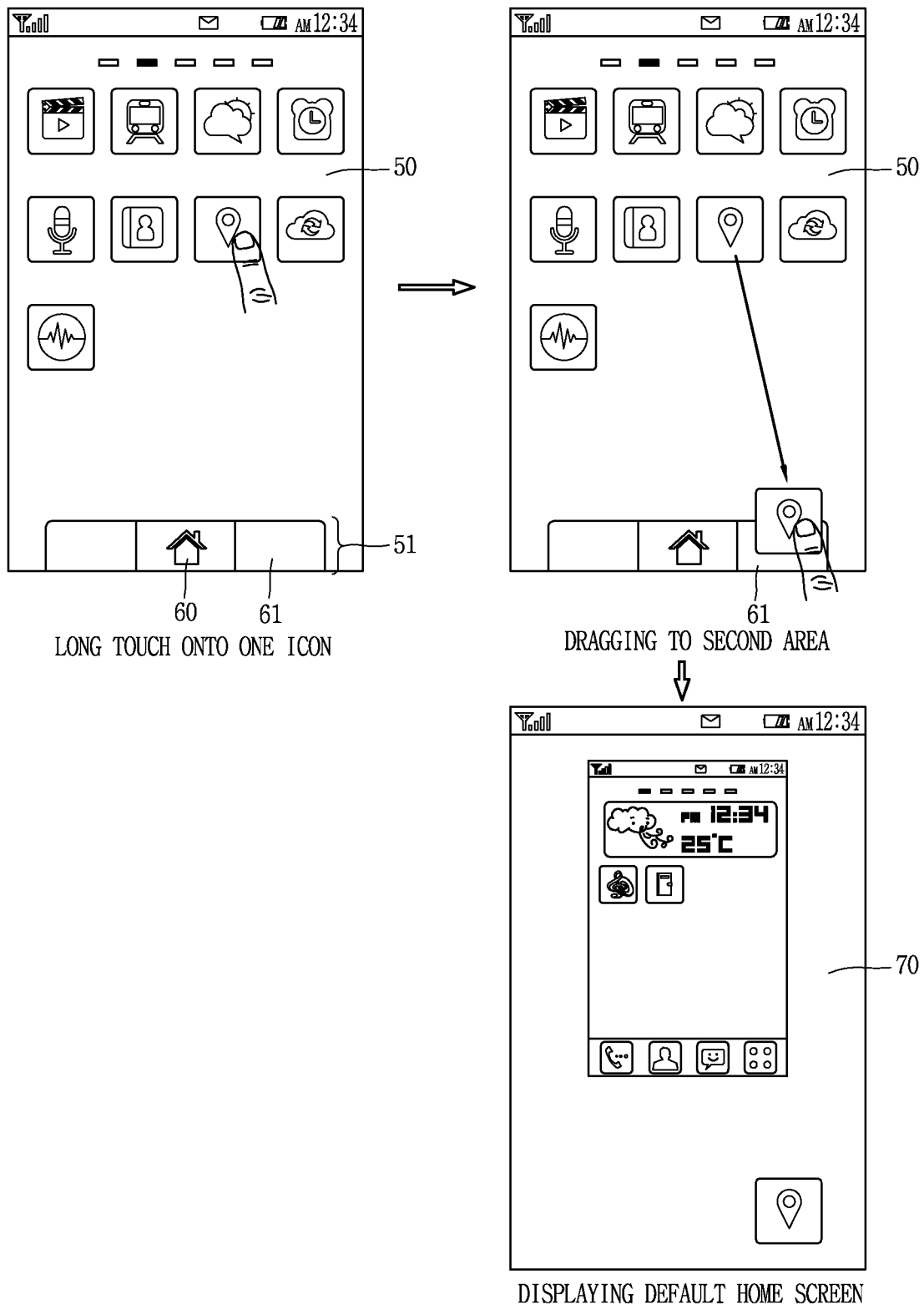

FIGS. 3A and 3B are views illustrating a conception of moving an icon from a full application screen (menu screen) to a home screen according to the present disclosure. Especially, FIG. 3A illustrates an example of displaying the whole home screen upon an icon movement, and FIG. 3B illustrates an example of displaying only one default home screen.

The full application screen (hereinafter, referred to as 'menu screen') may include an icon region 50 for displaying a plurality of applications icons, and a control region 51 for displaying a home button and other buttons (not shown). Therefore, the present disclosure may define a portion where the home screen is displayed on the menu screen as a first area 60, and a portion where other buttons are displayed as a second area 61. As another exemplary embodiment, the present disclosure may set the portion whether the other buttons are displayed to first and second areas in a dividing manner.

Each icon included in the icon region 50 of the menu screen may become movable in response to a long touch. A user may sequentially apply a long touch to at least one icon so as to make the at least one icons movable.

In this state, when an icon in the movable (selected) state is dragged into the control region 51, the present disclosure may display the whole home screen or one default home screen according to where the corresponding icon has been dragged within the control region 51. That is, when the icon in the movable state is moved (dragged) to the first area 60 of the control region 51, as illustrated in FIG. 4A, the full application screen (menu screen) may be switched into a home screen edition screen 70, and the whole home screen (for example, 5 home screens) set by the user may be displayed on one side of the home screen edition screen 70.

On the contrary, referring to FIG. 3B, when the icon in the movable state is moved (dragged) to the second area 61 of the control region 51, the full application screen (menu screen) may be switched into the home screen edition screen 70, and only one default home screen may be displayed on one side of the home screen edition screen 70.

Figure 4:
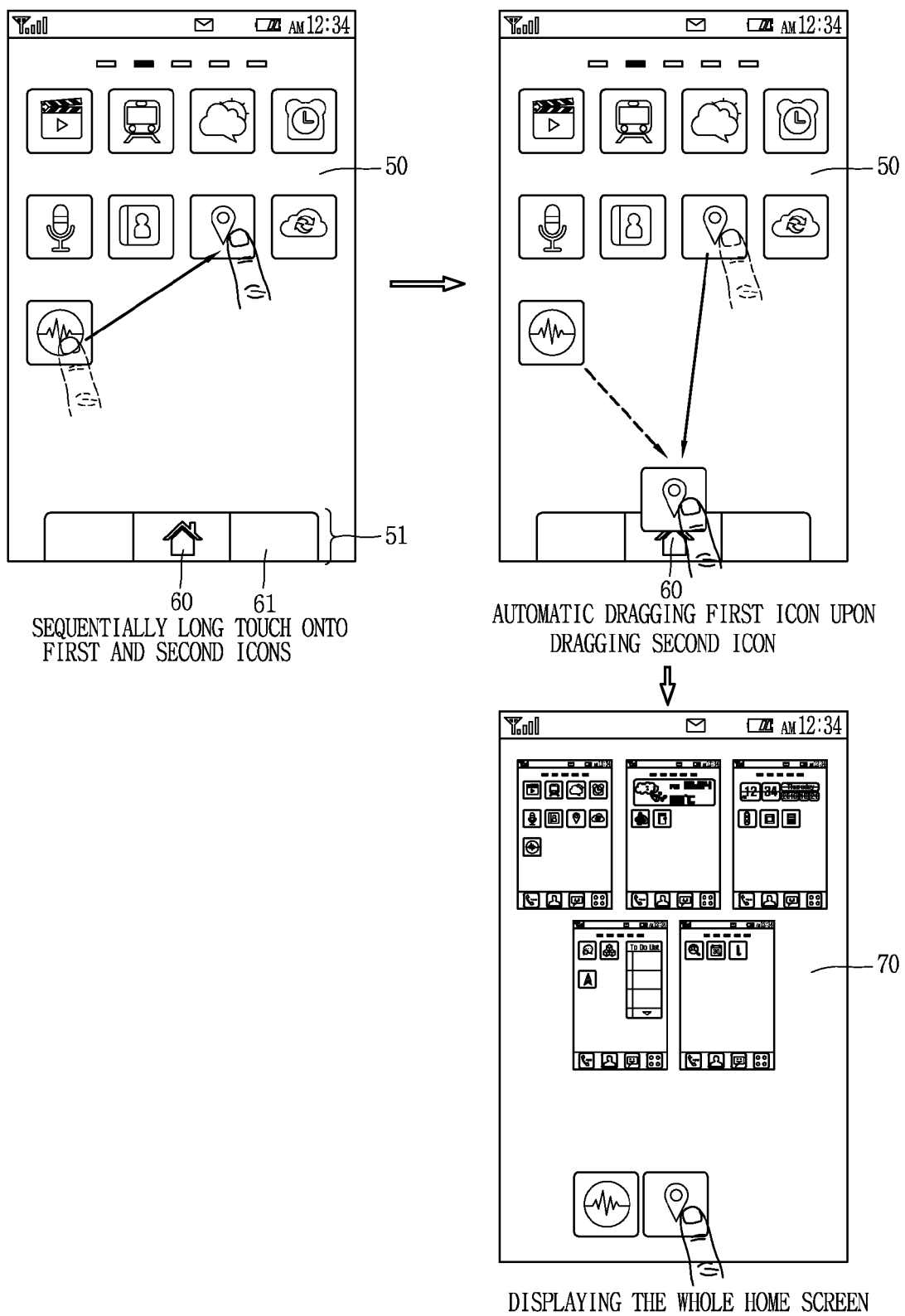
FIG. 4 is a view illustrating one embodiment of a home screen which is displayed when a plurality of icons are moved into a first area within a control region.

FIG. 4 illustrates one example of the home screen edition screen 70 which is displayed when a plurality of icons are moved to the first area 60.

Referring to FIG. 4, when a user sequentially applies a long touch to a plurality of icons (for example, first and second icons) to change into a movable state. The icons in the movable state may be connected in a form of chain. When the user moves (drags) one of the icons in the movable state into the first area 60, another icon may also be automatically dragged into the first area 60 to be displayed on the home screen edition screen 70.

Afterwards, the user may move the selected at least one icon to a home screen that the user wants, to register (insert) the at least one icon in the plurality of home screens simultaneously or individually. Hereinafter, the operation of moving (inserting or arranging) the moved at least one icon into the home screen will be described.

Displaying of Candidate Position For Icon Movement And Icon Movement

A default home screen and the whole home screen have sizes reduced by predetermined ratios. Therefore, when many icons are included in each home screen, it may be difficult to move a selected icon.

Figure 5A:
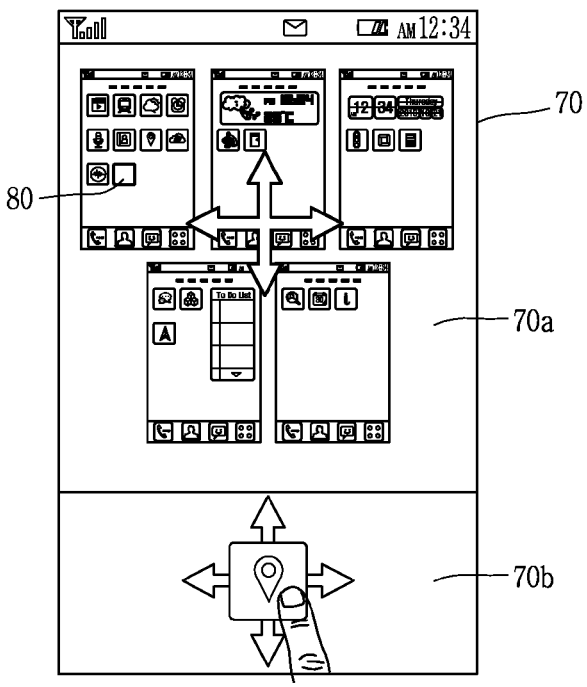
FIGS. 5A and 5B are views illustrating a first exemplary embodiment of an application icon moving method in accordance with the present disclosure.
Figure 5B:
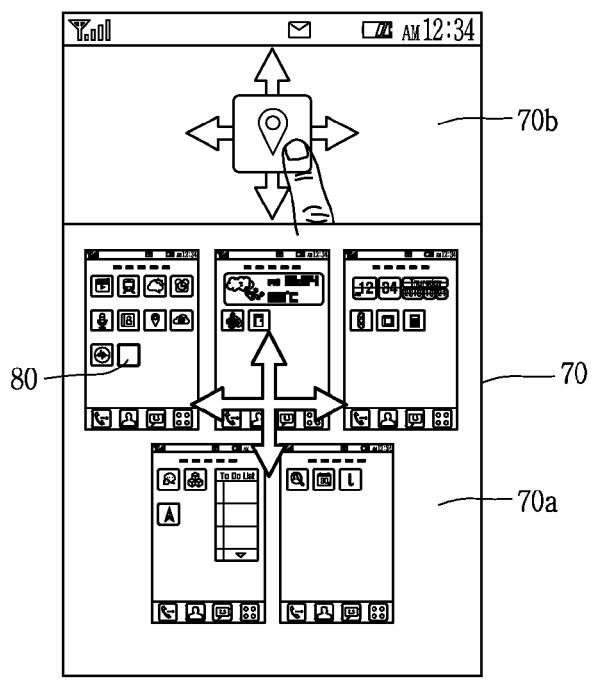

FIGS. 5A and 5B are views illustrating a first exemplary embodiment of an application icon moving method in accordance with the present disclosure. The first exemplary embodiment illustrates that 'default' has been selected as a candidate position searching method in a setting menu.

As illustrated in FIGS. 5A and 5B, a plurality of home screens may be displayed on the home screen edition screen 70. Each home screen may have a size decided according to the number of home screens registered by a user. In general, the home screens may be reduced in size as the number of homes screens registered increase. If the size of each home screen is reduced due to the increase in the number of home screens registered, it may be difficult to move an icon selected on the menu screen 50 to a desired position within each home screen.

To overcome the drawback, the present disclosure may allow the user to move icons more conveniently by visually guiding a candidate position (insertion position) 80, to which an icon is movable within a home screen, when the whole home screen or a default home screen is displayed. A size of the candidate position may be adjustable, and an icon may be displayed to correspond to the adjusted size of the candidate position.

A method for searching for the candidate position 80 within each home screen may be decided by a user's menu setting. The menu setting may be displayed when a corresponding icon is double touched or a partial area of a control region 70b to be explained later is long touched. The candidate position 80 may have a predetermined shape, and be displayed with being highlighted such that the user can easily visually recognize it. The number of candidate positions 80 may be decided by the number of icons displayed within the control region 70b.

In accordance with the first exemplary embodiment, the home screen edition screen 70 may be divided into a home screen region 70a for displaying the whole home screen registered, and a control region 70b for displaying icons moved from the menu screen 50. A size of the control region 70b may be adjustable in a touching manner. The home screen may not always be displayed only on the home screen region 70a, and may also be displayed even on the control region 70b when the home screens increase by a predetermined number. In the control region 70b, the user may maintain a dragged state from a previous screen or release the dragged state (remove a user's finger or hand). That is, even if the user's hand is removed from the control region 70b, the movement operation may not be completed. The movement operation may actually be carried out only when an icon is moved out of the control region 70b.

When at least one icon is moved (dragged) to the first area 60 by the operations of FIGS. 4A and 4B, the candidate position 80 may be automatically displayed on a home screen.

FIG. 5A illustrates a default method set through the setting menu. Various searching methods will be described in detail later. In the default method, a home screen on which the candidate position 80 is first displayed may be set by a user. FIG. 5A exemplarily illustrates that the candidate position 80 is displayed on a home screen, which is located at an uppermost left-hand side. The candidate position 80 displayed on the home screen at the uppermost left-hand side may be displayed on each home screen when the user drags an icon displayed within the control region 70b in an up-and-down direction and a left-to-right direction.

Therefore, the user may drag the icon within the control region 70b in the up-and-down direction and the left-to-right direction, to recognize the candidate position 80 of each home screen. Accordingly, the user may move at least one icon currently displayed within the control region 70b to the recognized candidate position 80.

The method of moving the icon to the candidate position 80 may include moving the corresponding icon up to the candidate position 80 directly by the user, automatically moving when the icon is dragged or flicked outside of the control region 70b after touching the icon, allowing the icon within the control region 70b to be automatically rolled into the candidate position 80 as the mobile terminal is inclined by more than a predetermined angle, and the like. Those methods may also be equally applied to the default home screen.

When one or more icons to be moved are displayed within the control region 70b, the one or more icons may be moved into the candidate position 80 individually or moved in a form of chain by simultaneously selecting two or more.

Also, the user may select a specific icon from each home screen, move the selected icon into the control region 70b, and thereafter move the icon into another home screen.

The present disclosure may allow for the icon movement between home screens displayed within the home screen region 70a as well as the movement of icons within the home screen region 70a and the control region 70b. The icon movement between the home screens may be achieved by selecting a specific icon displayed on one home screen and moving the icon to another home screen, or be automatically executed upon combining two home screens or deleting a predetermined home screen. Specifically, when two home screens are combined with each other, the icon movement and the icon arrangement may be carried out according to importance of a home screen, a generated time point (based on the latest home screen), and a dragged sequence (based on a dragged home screen). When a predetermined home screen is deleted, icons included in the deleted home screen may be automatically moved to a home screen having many empty spaces or a similar type of home screen.

The home screen to which the icon has been moved may be stored in the memory 160.

An operation of moving an icon moved from the menu screen 50 into each home screen by moving the icon within the control region 70b in four directions (up, down, left and right), illustrated in FIG. 5B, is the same as the operation illustrated in FIG. 5A, except for the position of the home screen region 70a and the control region 70b.

Figure 6:
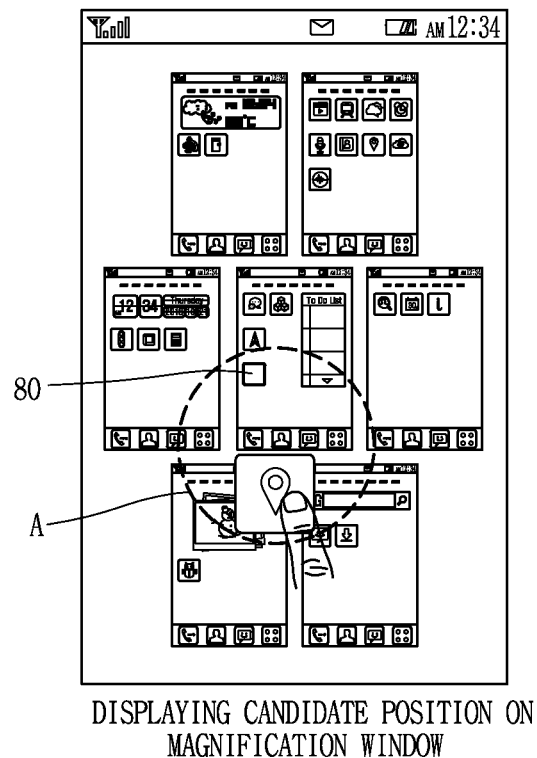
FIG. 6 is a view illustrating a second exemplary embodiment of an application icon moving method in accordance with the present disclosure.

FIG. 6 is a view illustrating a second exemplary embodiment of an application icon moving method in accordance with the present disclosure. The second exemplary embodiment illustrates that 'magnifier function' has been selected as a candidate position searching method in a setting menu.

That is, when a user touches an icon after a magnifier function is selected in the setting menu, a magnification window A may be displayed. A size of the magnification window A may be adjusted directly by the user in a touching manner, and also automatically adjusted according to the number of icons to be moved.

The magnification window A may be moved together with a touched icon when the icon is moved. During movement, the candidate position 80 to which the icon is to be moved may be displayed within the magnification window A.

As another exemplary embodiment, after the magnification window A is generated, the user may directly move the magnification window A by touching it. In this case, the icon may also be moved in response to the movement of the magnification window A.

Therefore, the user may move (insert) the icon into a specific home screen by recognizing the candidate position 80, in which the icon is to be inserted, within each home screen through the magnification window A, and dropping the corresponding icon onto a desired candidate position 80. Upon completion of the icon insertion, the magnification window A may disappear. If two or more icons are to be inserted, when one icon is inserted, another icon which comes with the one icon (in a form of chain) may be displayed on the magnification window A. Also, the magnification window A may be deleted by a delete icon, which appears in response to a long touch applied onto an edge of the magnification window A.

Figure 7A:
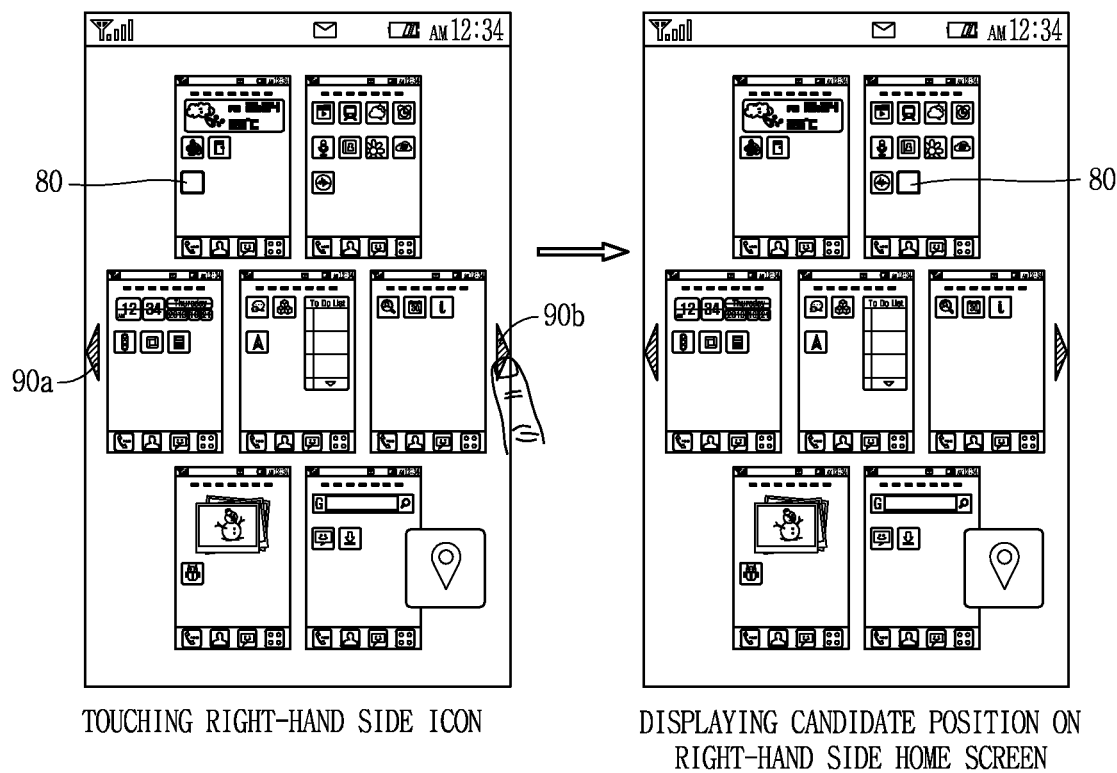
FIGS. 7A and 7B are views illustrating a third exemplary embodiment of an application icon moving method in accordance with the present disclosure.
Figure 7B:
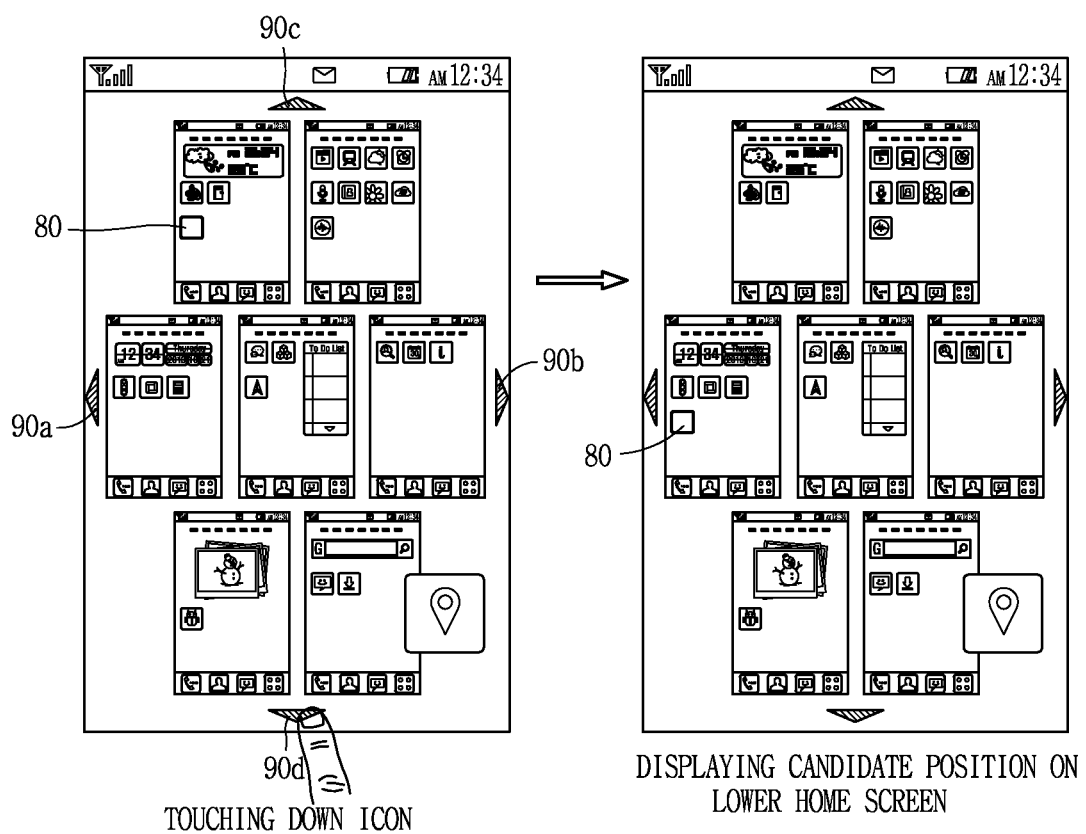

FIGS. 7A and 7B are views illustrating a third exemplary embodiment of an application icon moving method in accordance with the present disclosure. The third exemplary embodiment illustrates that 'move icon' has been selected as a candidate position searching method in a setting menu.

FIG. 7A illustrates an example of searching for the candidate position 80 located in four directions (up, down, let and right) by manipulation of left-hand side and right-hand side indicators 90a and 90b. When the left-hand side indicator 90a is touched, the candidate position 80 may be displayed sequentially on each home screen from right to left and from up to down according to the number of touches. When the right-hand side indicator 90b is touched, the candidate position 80 may be displayed sequentially on each home screen from right to left and from down to up according to the number of touches.

FIG. 7B illustrates an example of searching for the candidate position 80 in an up-and-down or left-to-right direction by manipulation of up, down, left and right indicators. When the up and down indicators 90c or 90d are touched, the candidate position 80 may be displayed sequentially on an upper or lower home screen according to the number of touches. When the left-hand side and the right-hand side indicators 90a or 90b are touched, the candidate position 80 may be displayed on a left-hand side or right-hand side home screen according to the number of touches.

The user may move (insert) the icon in a home screen by recognizing the candidate position 80, in which the icon is to be inserted, within each home screen, and dropping the corresponding icon onto the candidate position 80.

Figure 8A:
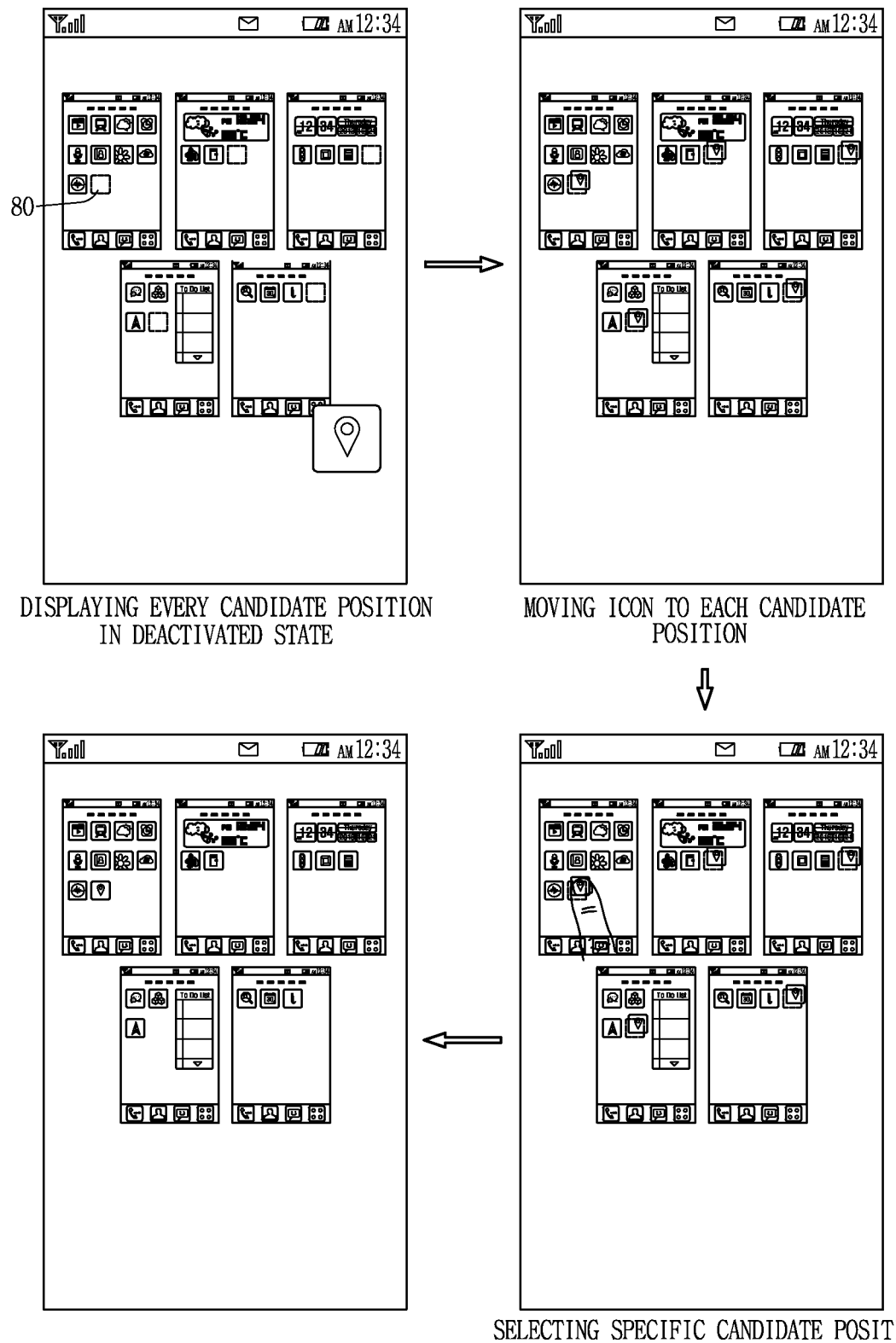
FIGS. 8A and 8B are views illustrating a fourth exemplary embodiment of an application icon moving method in accordance with the present disclosure.
Figure 8B:
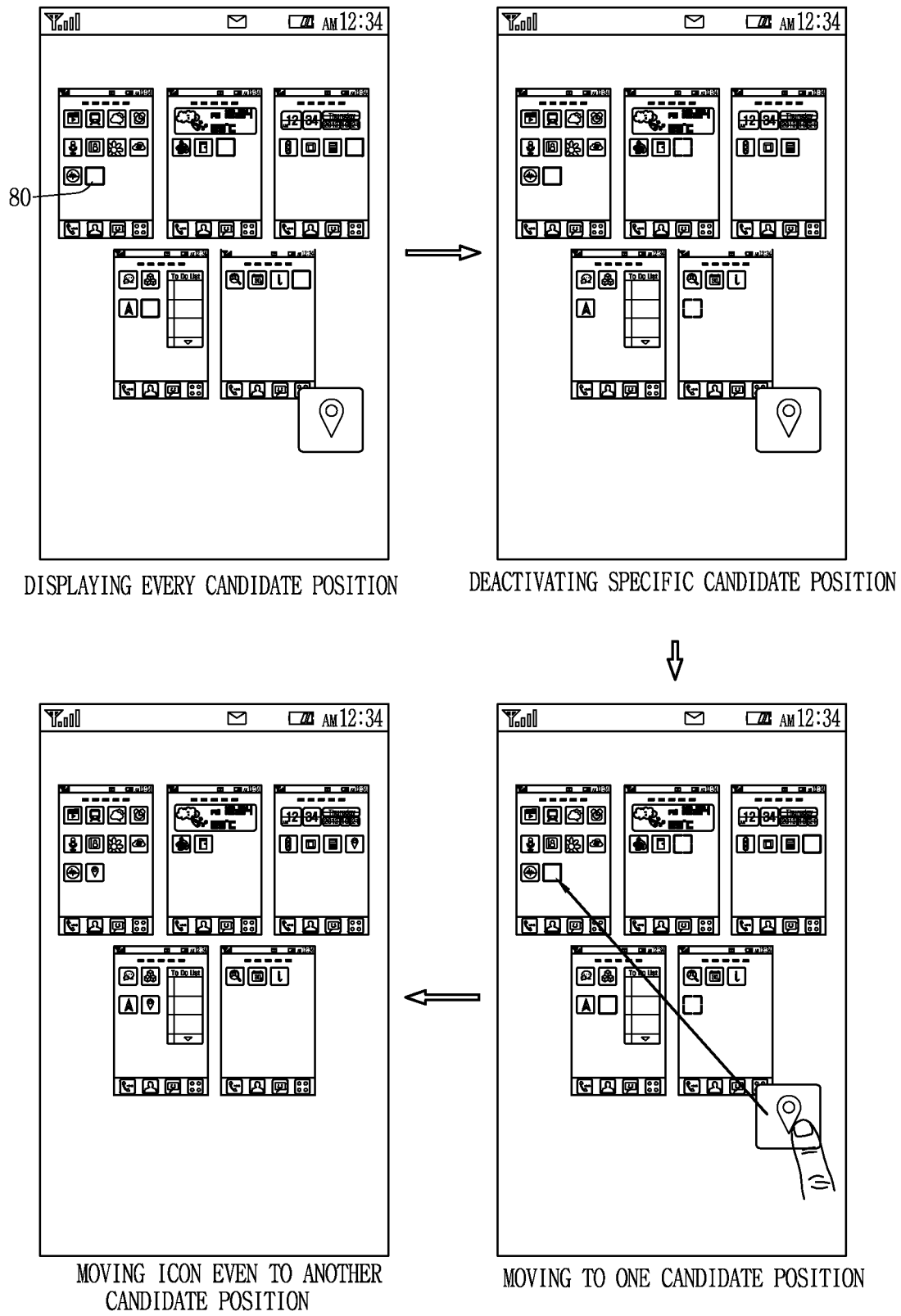

FIGS. 8A and 8B are views illustrating a fourth exemplary embodiment of an application icon moving method in accordance with the present disclosure. The fourth exemplary embodiment illustrates that 'display all the candidate positions' has been selected as a candidate position searching method in a setting menu.

When an icon is located in a home screen edition screen in a state that 'display all the candidate positions' has been set as the candidate position searching method in the setting menu or when 'display all candidate positions' has been set as the candidate position searching method in the setting menu in a state that an icon is located in the home screen edition screen, the candidate position 80 to which the icon is to be movable may be displayed on each home screen.

FIG. 8A illustrates an example that the candidate position 80 is displayed in a deactivated state, and FIG. 8B illustrates an example that the candidate position 80 is displayed in an activated state. These settings may be selectable from lower (sub) items of the 'display all the candidate positions' in the setting menu.

As illustrated in FIG. 8A, in a state that the candidate position 80 in the deactivated state is displayed, the user may move an icon to each deactivated candidate position 80 simultaneously or sequentially according to the various moving methods illustrated in FIG. 5A. That is, the user may move the corresponding icon directly to each deactivated candidate position 80, or move the icon by dragging or flicking the icon outside the control region 70b or allow the icon to be rolled into each deactivated candidate position 80 by inclining a lower portion of the terminal.

When the movement of the icon is completed, the user may select a specific deactivated candidate position, and decide the movement of the icon to the corresponding position. When the movement of the icon has been decided, the candidate positions which remain in the deactivated state and the icon may automatically disappear.

As one example, referring to FIG. 8A, with the deactivated candidate position 80 displayed, the user may sequentially or simultaneously move the icon to each deactivated candidate position 80 using the various moving methods illustrated in FIG. 5A. That is, the user may move the corresponding icon directly to each deactivated candidate position 80, or move the icon by dragging or flicking the icon outside the control region 70b or allow the icon to be rolled into each deactivated candidate position 80 by inclining a lower portion of the terminal.

When the movement of the icon is completed, the user may select a specific deactivated candidate position, and decide the movement of the icon to the corresponding position. When the movement of the icon has been decided, the candidate positions which remain in the deactivated state and the icon may automatically disappear.

As another example, referring to FIG. 8B, with the deactivated candidate position 80 displayed, the user may sequentially or simultaneously move the icon to each deactivated candidate position 80 using the various moving methods illustrated in FIG. 5A. Here, for moving the same icon to a plurality of candidate positions, the same icon may simultaneously be inserted into the other candidate positions when one icon is dragged directly to one candidate position or moved outside the control region 70b or when the terminal is inclined.

FIG. 9 is a view illustrating a fifth exemplary embodiment of an application icon moving method in accordance with the present disclosure. The fifth exemplary embodiment illustrates that 'home window' has been selected as a candidate position searching method in a setting menu, namely, an icon is moved according to a type of home window.

Referring to FIG. 9, when a finger is taken away in a state that an icon is located on a home screen edition screen, an icon arrangement menu 91 may automatically be displayed near the corresponding icon. The icon arrangement menu 91 may include items set based on a state of a home screen, for example, a similar type, an arrangement sequence, a home screen with many empty spaces, and the like.

When the user selects a specific item, for example, 'in sequence' from the icon arrangement menu 91, the icon may be automatically moved to each candidate position (not shown) of all the home screens in a sequential manner to be arranged. Also, when the user selects 'space', the icon may be automatically displayed on a home screen with many empty spaces (based on a predetermined reference).

Figure 10:
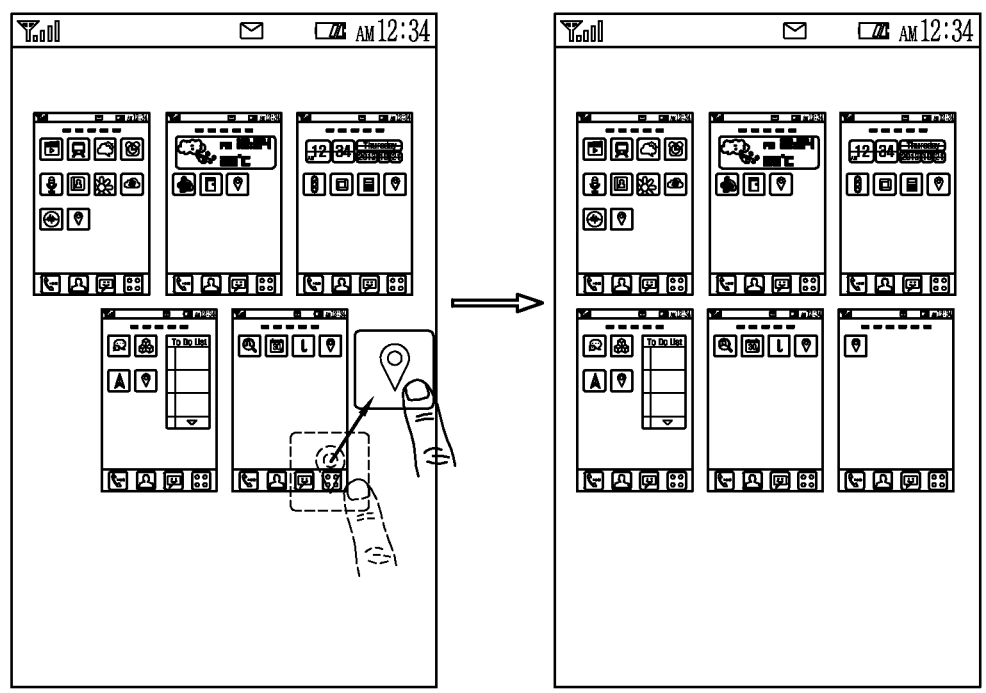
FIG. 10 is a view illustrating a sixth exemplary embodiment of an application icon moving method in accordance with the present disclosure.

FIG. 10 is a view illustrating a sixth exemplary embodiment of an application icon moving method in accordance with the present disclosure. The sixth exemplary embodiment illustrates an icon is arranged by generating a new home screen.

The present disclosure may allow for generating a new home screen on a home screen edition screen. The foregoing embodiments have illustrated that the icon is moved to a previously generated (registered) home screen, but the icon may also be arranged within a new home screen.

As illustrated in FIG. 10, in a state that an icon is located on a home screen edition screen, when the user drags the icon into an empty space of a home screen region and drops the icon onto the empty space, a new home screen may be generated on the corresponding position and the corresponding icon may be displayed thereon. The user may easily execute the home screen generation and the icon movement by the series of operations.

Figure 11:
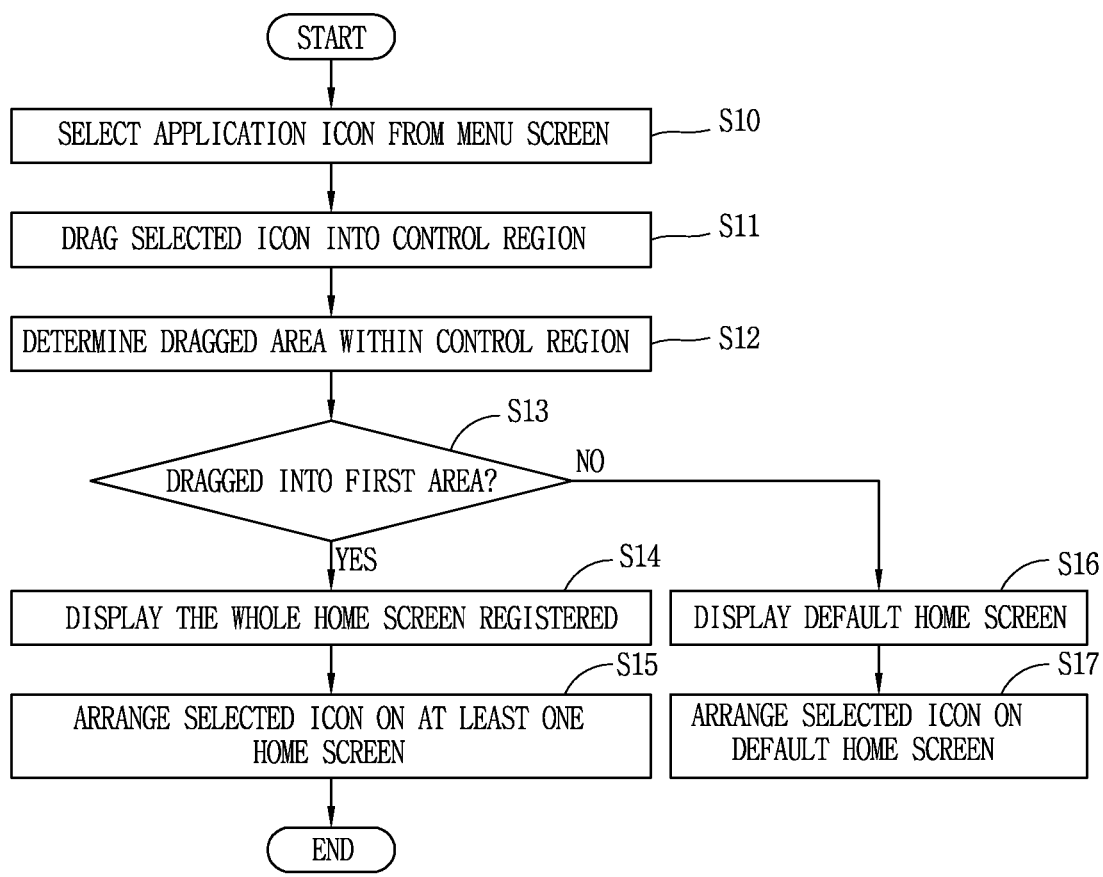
FIG. 11 is a flowchart illustrating an application icon moving method in accordance with an exemplary embodiment of the present disclosure.

FIG. 11 is a flowchart illustrating an application icon moving method in accordance with an exemplary embodiment of the present disclosure.

In general, a menu screen of the display 151 may include a plurality of application icons. The menu screen may be divided into an icon region 50 and a control region 51 for displaying a home button and the like. In the present disclosure, a portion where the home button is displayed may be set to a first area 60, and a portion where other buttons are displayed may be set to a second area 61.

In order to move the icon displayed on the menu screen to a home screen, when the user selects at least one icon within the icon region 50 using a long touch (S10) and then drags the at least one icon to the control region 51 (S11), the controller 180 may display the whole home screen or one default home screen according to a determined area to which the corresponding icon has been dragged (S14 or S16).

That is, the controller 180 may determine whether or not the dragged area of the corresponding icon is the first area (S12 and S13). When the icon-dragged area is the first area, the controller 180 may open the home screen edition screen to display all the home screens set (registered) by the user (S14).

Therefore, as aforementioned, the user may move the icon from the home screen edition screen displaying all the home screens to at least one home screen and arrange the icon thereon (S15), or execute movement, deletion, combination and generation of the home screen.

On the contrary, when the icon-dragged area is the second area, the controller 180 may display the default home screen set by the user on the home screen edition screen, similar to the related art (S15). Accordingly, the user may move and arrange the selected icon to the default home screen (S17).

As described above, according to the foregoing exemplary embodiments of the present disclosure, when an icon is moved to a specific area, the whole home screen to which a specific application icon displayed on a menu screen is movable may be displayed, and an icon-movable position may be visually guided on each home screen, which may allow for movement and arrangement of the icon within the home screen in an easy, convenient manner.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

The configurations and methods of the mobile terminal in the aforesaid embodiments may not be limitedly applied, but such embodiments may be configured by a selective combination of all or part of the embodiments so as to implement many variations.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An icon moving method for a mobile terminal, the method comprising:
   displaying a home screen of a plurality of home screens, wherein the displayed home screen includes a plurality of icons;
   moving an icon of the plurality of icons to a control region according to a first input;

displaying only a default home screen of the plurality of home screens when the icon is moved to a first area of the control region;

displaying the plurality of home screens when the icon is moved to a second area of the control region;

moving the icon to the displayed default home screen or one of the displayed plurality of home screens according to a second input and arranging the icon on the default home screen or the one of the displayed plurality of home screens.

2. The method of claim 1, wherein the icon comprises two or more icons of the plurality of icons.

3. The method of claim 2, wherein the two or more icons are selected for moving by the first input which comprises a touch and hold input for a threshold length of time sequentially to each of the two or more icons.

4. The method of claim 1, wherein:

the first input comprises a touch drag of the icon from the displayed home screen to the control region; and the second input comprises a touch drag of the icon from the control region continuous with the drag of the first touch input.

5. The method of claim 1, further comprising displaying a candidate position at which the icon is to be positioned on the displayed default home screen or the one of the displayed plurality of home screens.

6. The method of claim 5, wherein the candidate position has a predetermined shape and size and is distinctively displayed.

7. The method of claim 5, wherein the candidate position is displayed when the icon is moved toward the candidate position according to the second input.

8. The method of claim 7, further comprising displaying a magnified portion comprising the candidate position.

9. The method of claim 1, wherein the second input comprises a touch drag, a touch flick, or an inclination of the mobile terminal.

10. The method of claim 1, wherein the second input comprises a touch drag of the icon from the control region to the displayed default home screen or to the one of the displayed plurality of home screens, and the icon is arranged in response to a termination of the touch drag.

11. A mobile terminal comprising:

a touchscreen configured to display information;

a memory configured to store information; and a controller configured to:

cause the touchscreen to display a home screen of a plurality of home screens, wherein the displayed home screen includes a plurality of icons;

move an icon of the plurality of icons to a control region according to a first input;

cause the touchscreen to display only a default home screen of the plurality of home screens when the icon is moved to a first area of the control region;

cause the touchscreen to display the plurality of home screens when the icon is moved to a second area of the control region;

move the icon to the displayed default home screen or one of the displayed plurality of home screens according to a second input and arrange the icon on the displayed default home screen or the one of the displayed plurality of home screens.

12. The terminal of claim 11, wherein the icon comprises two or more icons of the plurality of icons.

13. The method of claim 12, wherein the two or more icons are selected for moving by the first input which comprises a touch and hold input for a threshold length of time sequentially to each of the two or more icons.

14. The terminal of claim 11, wherein:

the first input comprises a touch drag of the icon from the displayed home screen to the control region received via the touchscreen; and the second input comprises a touch drag of the icon from the control region continuous with the touch drag of the first touch input received via the touchscreen.

15. The terminal of claim 11, wherein the controller is further configured to cause the touchscreen to display a candidate position at which the icon is to be positioned on the displayed default home screen or the one of the displayed plurality of home screens.

16. The terminal of claim 15, wherein the candidate position has a predetermined shape and size and is distinctively displayed.

17. The terminal of claim 15, wherein the controller is further configured to cause the touchscreen to display the candidate position when the icon is moved toward the candidate position according to the second input.

18. The terminal of claim 17, wherein the controller is further configured to cause the touchscreen to display a magnified portion comprising the candidate position.

19. The terminal of claim 11, wherein the second input comprises a touch drag of the icon from the control region to the displayed default home screen or to the one of the displayed plurality of home screens, and the icon is arranged in response to a termination of the touch drag.

20. The terminal of claim 11, wherein the second input comprises a touch drag, a touch flick, or an inclination of the mobile terminal.

* * * * *